(12) United States Patent
Grienitz et al.

(10) Patent No.: US 10,800,276 B2
(45) Date of Patent: Oct. 13, 2020

(54) ELECTRICAL CHARGING ARRANGEMENT WITH CHARGING SOCKET FOR VEHICLE

(71) Applicant: Benteler Automobiltechnik GmbH, Paderborn (DE)

(72) Inventors: Volker Grienitz, Soest (DE); Frank Rabe, Hiddenhausen (DE); Mohamed Boughardain, Braunschweig (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 316 days.

(21) Appl. No.: 15/898,250

(22) Filed: Feb. 16, 2018

(65) Prior Publication Data

US 2018/0236884 A1 Aug. 23, 2018

(30) Foreign Application Priority Data

Feb. 17, 2017 (DE) .......................... 10 2017 103 271

(51) Int. Cl.
| | |
|---|---|
| *H01M 10/46* | (2006.01) |
| *B60L 53/14* | (2019.01) |
| *H01B 7/42* | (2006.01) |
| *H02G 3/03* | (2006.01) |
| *B60L 53/16* | (2019.01) |
| *B60L 3/00* | (2019.01) |

(52) U.S. Cl.
CPC ............. *B60L 53/14* (2019.02); *B60L 3/0023* (2013.01); *B60L 53/16* (2019.02); *H01B 7/423* (2013.01); *H01B 7/426* (2013.01); *H02G 3/03* (2013.01); *B60L 2240/36* (2013.01)

(58) Field of Classification Search
USPC ................... 320/104, 109, 150, 153
See application file for complete search history.

(56) References Cited

U.S. PATENT DOCUMENTS

| | | |
|---|---|---|
| 2006/0144612 A1 | 7/2006 | Johansson |
| 2009/0256523 A1 | 10/2009 | Taguchi |
| 2010/0304256 A1 | 12/2010 | Chan et al. |
| 2012/0043935 A1 | 2/2012 | Dyer et al. |
| 2013/0267115 A1 | 10/2013 | Mark |
| 2015/0001021 A1 | 1/2015 | Matsumoto et al. |
| 2017/0151879 A1* | 6/2017 | Guillermin .......... B65H 75/425 |

FOREIGN PATENT DOCUMENTS

| | | |
|---|---|---|
| CN | 101522459 A | 9/2009 |
| CN | 202076386 U | 12/2011 |
| CN | 104080640 A | 10/2014 |
| DE | 12012003099 T5 | 7/2014 |

OTHER PUBLICATIONS

German Office Action for Application No. 10 2017 103 271.1, dated Mar. 27, 2017, 10 pages.
Office Action for Chinese Application No. 201810147702.0 dated Aug. 4, 2020; 12 pp.

* cited by examiner

*Primary Examiner* — Edward Tso
(74) *Attorney, Agent, or Firm* — Hauptman Ham, LLP

(57) ABSTRACT

An electrical charging arrangement in a motor vehicle is disclosed having a power coupling element and at least one current conductor. A cooling element is arranged on the rear side of the power coupling element facing the current conductor so that the power coupling element can be cooled from the rear side.

10 Claims, 3 Drawing Sheets

ELECTRICAL CHARGING ARRANGEMENT WITH CHARGING SOCKET FOR VEHICLE

RELATED APPLICATIONS

The present application claims the priority of German Application Number 10 2017 103 271.1 filed Feb. 17, 2017, the disclosure of which is hereby incorporated by reference herein in its entirety.

BACKGROUND

1. Field of the Invention

The disclosure is related to an electrical charging arrangement in a motor vehicle having a power coupling element and at least one current conductor, and more specifically, to a heat management apparatus and method in an electrical charging arrangement of an electric vehicle.

2. Description of the Related Art

Electric vehicles are becoming increasingly important, and therefore electrification of the drive train in a motor vehicle will further increase in the future. Electric vehicles contain an electric drive and carry an energy store in the form of a rechargeable electric battery or an accumulator battery.

The charging time for the accumulator batteries used at present depends both on the efficiency of the charging apparatus and also on the technical design of the components of the electrical charging path in the vehicle.

If a vehicle or the accumulator battery of the vehicle is charged with a high electrical power, a considerable amount of heat is produced at the contact transitions in the charging plug, in particular between the contacts of the vehicle-side power coupling means and the contacts of the apparatus-side charging plug. A vehicle-side power coupling means is often also called the charging socket or charging jack.

It is known from electrical conductors and plug-connections of the electrical charging stations for electric vehicles that the electrical power which can be transmitted at the permissible electrical voltage is limited by the thermal load-bearing ability of the electrical lines and of the plug-in contacts which, on account of the electrical transfer resistance at the contact point of small surface area, have the greatest power loss density in the electrical charging circuit. Contact heating currently limits the performance of electrical rapid charging stations. Liquid-cooled, flexible electrical lines and liquid-cooled plugs and, respectively, plug-in contacts are used for the purpose of increasing the amount of power that can be transmitted. However, this leads to an increase in size and weight and also to a reduction in line flexibility and the ability to manage the line flexibility.

An electrical connection, which can be cooled, between the charging connection and the electric battery is also described, amongst other things, within the scope of DE 11 2012 003 099 T5 which describes a charging station for rapidly charging an electric vehicle battery.

US 2009/0256523 A1 likewise discloses a charging station. A charging plug which is electrically connected to the charging station is provided with channels which carry water and air. Accordingly, the charging socket of the vehicle to be charged also has channels which are connected to the plug-side channels when the charging socket and charging plug are joined. Cooling circuits (air, water) are closed in this way. The cooling circuits are intended to serve, in particular, for cooling vehicle-side electrical drive components.

SUMMARY

According to an exemplary embodiment, an electrical charging arrangement for a motor vehicle is disclosed, in which the electrical charging arrangement is more powerful in comparison to the prior art and exhibits efficient cooling of the power coupling means and allows electrical power to be transmitted at high electrical current intensities and high electrical voltages with a low level of loss.

The electrical charging arrangement is an on-board constituent part of a motor vehicle and comprises a power coupling means and at least one current conductor, in particular a high-current conductor. The power coupling means is also called a charging socket or charging jack and serves to receive a charging plug which is arranged at the free end of a charging cable and is attached to a charging station by means of the charging cable. The power coupling means is attached to the energy store, that is to say in particular to an accumulator battery, of the motor vehicle by means of the current conductor.

According to one exemplary embodiment, a cooling means is arranged on the rear side of the power coupling means, which rear side faces the current conductor, and therefore the power coupling means can be cooled from the rear side. Accordingly, cooling takes place from the vehicle side. In the process, heat or thermal energy is drawn from the power coupling means. This thermal energy can be used at a different location in the motor vehicle, for example for the purpose of temperature control or for additional energy generation.

The disclosure provides a powerful electrical charging arrangement for motor vehicles with efficient cooling of the power coupling means. Owing to the inventive design and cooling of the power coupling means, low-loss transmission of high electrical current intensities and levels up to an electrical voltage of 1000 V AC (Alternating Current) or of 1500 V DC (Direct Current) is possible.

The cooling means can be an air cooling means. To this end, a fan is associated with the power coupling means. The fan is expediently attached directly to the rear side of the power coupling means.

Furthermore, the cooling means can be a fluid cooling means. In this case, a liquid or gaseous cooling medium or heat carrier medium is conducted through a heat exchanger module which is connected to the power coupling means. Coolant conductors are integrated for guiding coolant. Heat carrier channels can also be a constituent part of the system and can be used for discharging thermal energy.

The power coupling means is cooled by the vehicle-side thermal management system by means of the cooling means which is arranged on the rear side of the power coupling means. The current conductor or high-current conductor can also be cooled at the same time. A liquid or gaseous heat carrier delivers the heat which is produced by the electrical current intensity across the electrical line and transfer or contact resistors to an exterior heat exchanger (radiator) or to the interior heat exchanger (interior heating/air-conditioning system) either indirectly by means of an intermediate heat exchanger or directly.

As stated, the electrical current conductor can optionally be fitted with a fan for the purpose of cooling the conductor and the power coupling means.

Therefore, one aspect of the exemplary embodiment provides that the cooling means comprises heat exchanger elements, in particular a coolant conductor and/or a heat carrier channel and/or a coolant collector.

One refinement which is advantageous for practical use provides that the current conductor comprises at least one extruded conductor profile which is composed of a light alloy.

The current conductor is designed as a high-current conductor. In the case of rapid DC (Direct Current) charging, a charging current intensity of up to 250 A is currently transmitted in an uncooled manner. A charging current intensity of 350 A, possibly even up to 400 A DC, is sought. Electrical drive train powers of greater than 12 kW are realized over the high-voltage level of the traction accumulator battery, where the value of the electrical voltage is the result of the electrical current intensity of approximately 250 A which can be transmitted. In electric vehicle technology for passenger cars, accumulator batteries with an electrical voltage of up to 400 V are provided; in contrast, accumulator batteries with an electrical voltage of up to 800 V are provided in the case of commercial vehicles. In principle, it can be said that a "high voltage" in the automotive sector refers to a voltage of above 60 V. The high-voltage level is at most $60 < U \leq 1500$ V DC, $30 < U \leq 1000$ V AC rms.

The conductor profile is particularly preferably composed of an aluminum alloy. A wrought aluminum alloy with an aluminum content of at least 99%, for example Al 99.5 (EN AW-1050) can preferably be used.

It is further provided within the scope of the disclosure that the conductor profile has at least one inner channel which is closed at the circumference. This channel serves for guiding a heat carrier medium and/or for guiding power or pipe bodies. Line pipes can be, for example, supply lines or data lines. Pipe bodies can be separate pipelines, for example coolant conductors or coolant pipes or heat carrier channels, also called heat pipes.

The aim of a further aspect is that the current conductor can also be cooled. Accordingly, the or each channel in the current conductor or in the conductor profiles of the current conductor are intended to conduct a cooling medium. Liquid or gaseous cooling media or heat carrier media can be used here.

Furthermore, the current conductor or the conductor profile or conductor profiles which form the current conductor can have on the outer faces heat transfer elements and/or profile elements which increase stiffness. Heat transfer elements, and likewise profile elements which increase stiffness, are preferably in the form of ribs or webs.

A further advantageous refinement of the disclosure provides that at least two conductor profiles are arranged parallel to one another, wherein the conductor profiles are insulated from one another and attached to one another by an insulator. In this case, the conductor profiles are connected by insulators which are configured in an appropriate manner in respect of material and geometrically. Both the conductor profiles and also the insulator which connects the conductor profiles to one another advantageously have complementary interlocking sections which engage one in the other.

The charging arrangement according to the disclosure is distinguished by a low level of transfer losses and has a relatively high degree of efficiency and a relatively high electrical performance and, respectively, transmission capability. The option of dissipating the heat caused by the electrical current intensity from the peripheral lines and plugs to a cooling area or a cooling apparatus by means of the cooling means allows the mass of the electrical charging arrangement to be reduced. Furthermore, a reduction in the charging time of the accumulator battery in a motor vehicle can be expected due to the charging arrangement. In particular, the active cooling of the power coupling means from the vehicle side allows the electrical power which can be transmitted to be increased.

According to one exemplary embodiment, the cooling system is located on-board a motor vehicle and has a power coupling means (charging socket) which can be cooled from the motor vehicle end and has a charging line, that is to say the current conductor, from the power coupling means to the electrical accumulator and also to a cooling assembly with corresponding control means for cooling means and/or the cooling circuit. The control means can be designed such that the system automatically identifies when a cooling means is required and switches on the cooling means as required.

BRIEF DESCRIPTION OF THE DRAWINGS

For an understanding of embodiments of the disclosure, reference is now made to the following description taken in conjunction with the accompanying drawings, in which.

In the figures, the same reference signs are used for identical or similar component parts, even if a repeated description is omitted for reasons of simplification.

DETAILED DESCRIPTION OF SOME EMBODIMENTS

Some embodiments will be now described with reference to the Figures.

Figure 1:
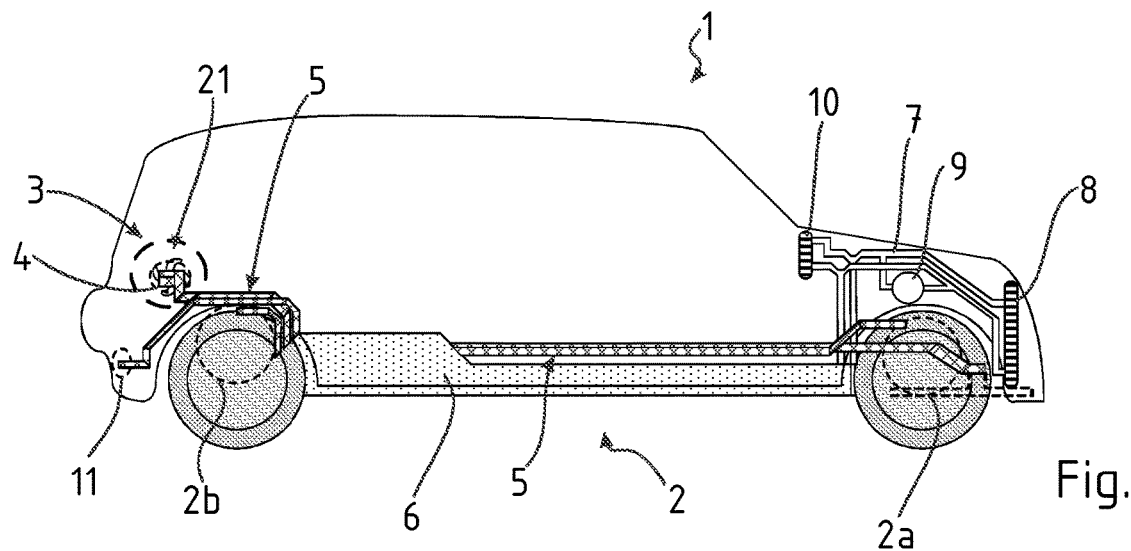
FIG. 1 shows a side sectional view of a motor vehicle having an electrical charging arrangement and system components in accordance with one exemplary embodiment.

Referring to FIG. 1, a motor vehicle 1 is shown having an electrical drive system 2 and components of the electrical charging path and also components of the heat management system.

An electrical charging arrangement 3 comprises a power coupling means 4. The power coupling means 4 is a receiver for conductive power transmission. Electrical energy is fed to the on-board electrical system of the motor vehicle 1 by means of the power coupling means 4. A current conductor 5 extends from the power coupling means 4 as far as an electrical rechargeable battery 6. The current conductor 5 is a high-current conductor.

Heat carrier channels 7 run at the necessary locations in the motor vehicle 1. The current conductor 5 leads from the power coupling means 4 to the rechargeable battery 6 and from there to the front wheel electric drive 2a and to a rear wheel electric drive 2b. FIG. 1 also illustrates an exterior heat exchanger 8, a heat carrier pump 9 and an interior heat exchanger 10 and also an optional power coupling means 11.

FIGS. 2 to 6 show five different embodiments of an electrical charging arrangement 3 in a motor vehicle 1 comprising a power coupling means 4 and a section of a current conductor 5.

The power coupling means 4 is located in the motor vehicle 1, usually in the region of the outer wall, and serves to receive a charging plug which is electrically attached to a charging station by means of a supply cable. To this end, the charging plug can be inserted into a plug-in receptacle 13 which is provided on the front side 12 of the power coupling means 4. An electrical link is established between the rechargeable battery 6 to be charged and the charging station by means of contact pieces 14. A plurality of pin-like contact pieces 14 are usually provided in the power coupling means 4.

The current conductor 5 comprises two conductor profiles 15, 16. The conductor profiles 15, 16 are arranged geometrically parallel to one another and are insulated from one another and also attached to one another by an insulator 17. The electrical coupling between the contact pieces 14 and the conductor profiles 15, 16 is established by means of upper and lower electrical conductors or contact shoes 18. The contact shoes 18 are configured for electrical coupling to the current conductor 5 and, respectively, to the conductor profiles 15, 16. The conductor profiles 15, 16 are composed of a light alloy, in particular a wrought aluminum alloy and are extruded. In the interior, the conductor profiles 15, 16 have at least one channel—not illustrated here—which is closed at the circumference and extends through the conductor profiles 15, 16 in the longitudinal direction thereof. A channel of this kind is provided for conducting a heat carrier medium and/or for receiving line or pipe bodies.

Heat transfer elements and/or profile elements, which increase stiffness, in the form of ribs 19 are provided on the outer sides of the conductor profiles 15, 16.

A cooling means 21 is arranged on the rear side 20 of the power coupling means 4, which rear side faces the current conductor 5. The cooling means 21 is integrated as a structural unit between the power coupling means 4 and the current conductor 5. The power coupling means 4 can be cooled from the rear side 20, that is to say from the motor vehicle, by means of the cooling means 21.

Figure 2:
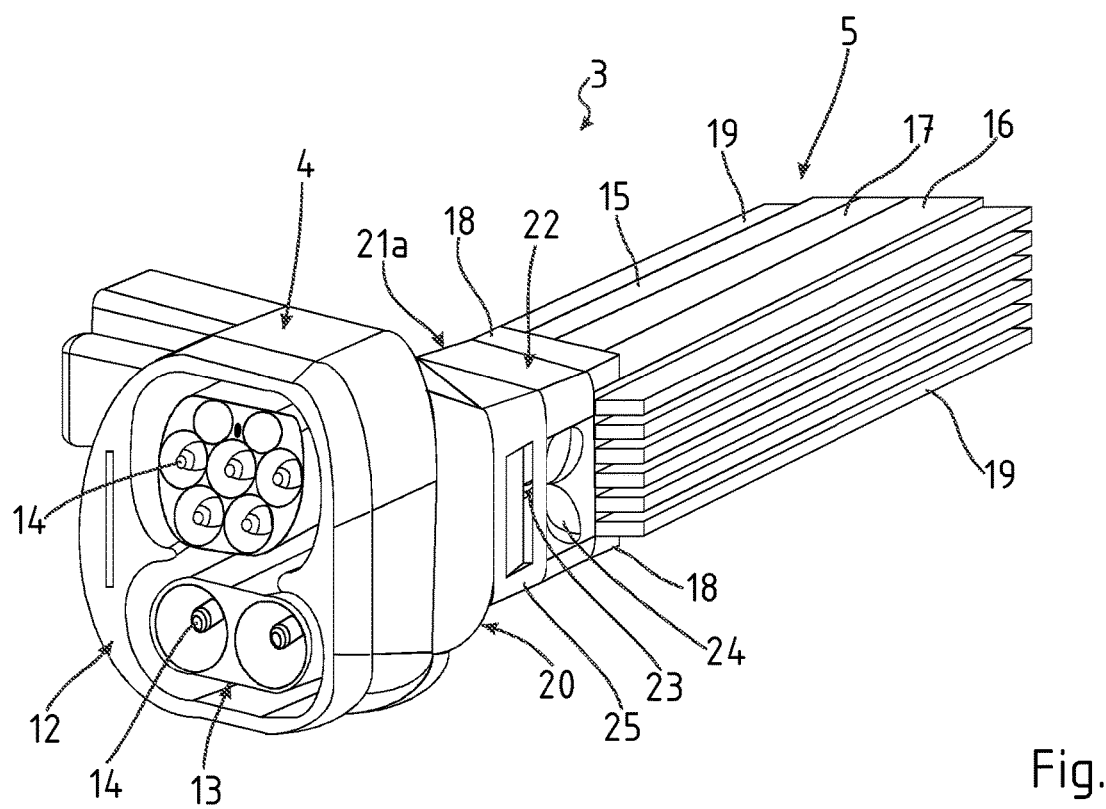
FIG. 2 shows an electrical charging arrangement in accordance with some embodiments.

In the refinement according to FIG. 2, the cooling means 21a of the electrical charging arrangement 3 is an air cooling means. The air cooling means comprises a fan 22 with a rotor 24 which is arranged on a rotor shaft 23 and is driven by means of a rotor drive 25.

Figure 3:
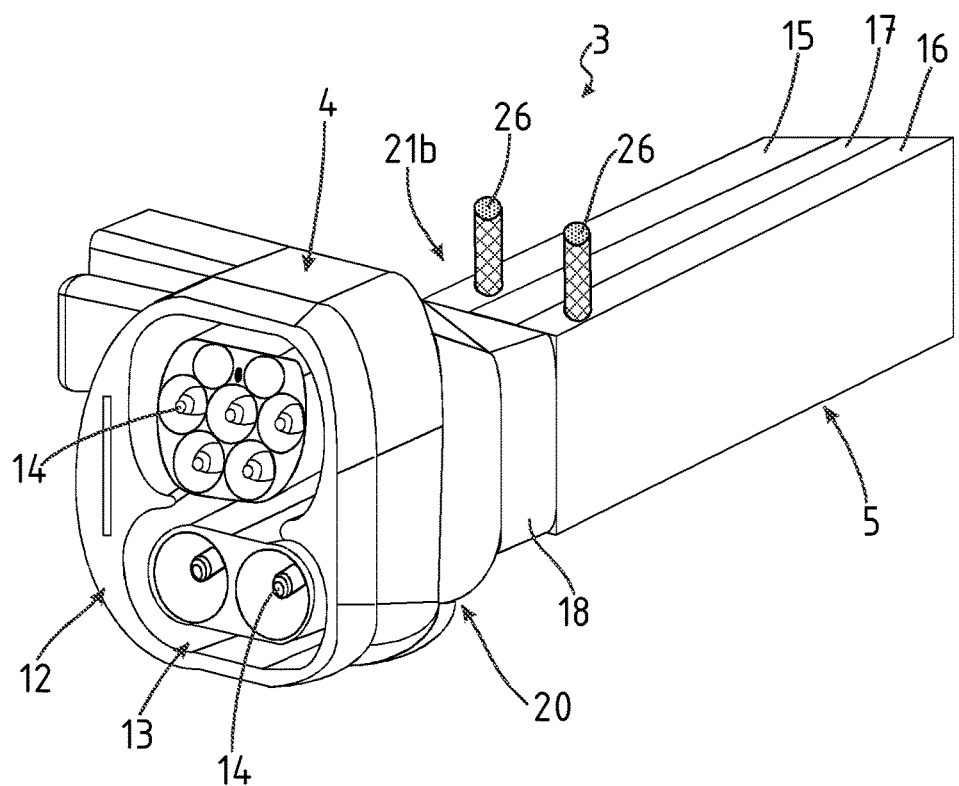
FIG. 3 shows an electrical charging arrangement in accordance with some embodiments.

In the charging arrangement 3 as illustrated in FIG. 3, a cooling means 21b is provided on the rear side 20 of the power coupling means 4, which rear side faces the current conductor 5. The cooling means 21b is a fluid cooling means. Pipe bodies 26 are integrated into the current conductor 5 and, respectively, the conductor profiles 15, 16 for the purpose of separating heat, the pipe bodies coming into contact with heat transfer areas of the power coupling means 4 so as to dissipate heat. The pipe body 26 may be a coolant conductor or heat carrier channels. These are electrically insulated from the current conductor 5 and, respectively, the conductor profiles 15, 16. The pipe bodies 26 are guided from the outside, via sealed-off connection openings, into the interior of the current conductor 5 and, respectively, of the conductor profiles 15, 16.

Figure 4:
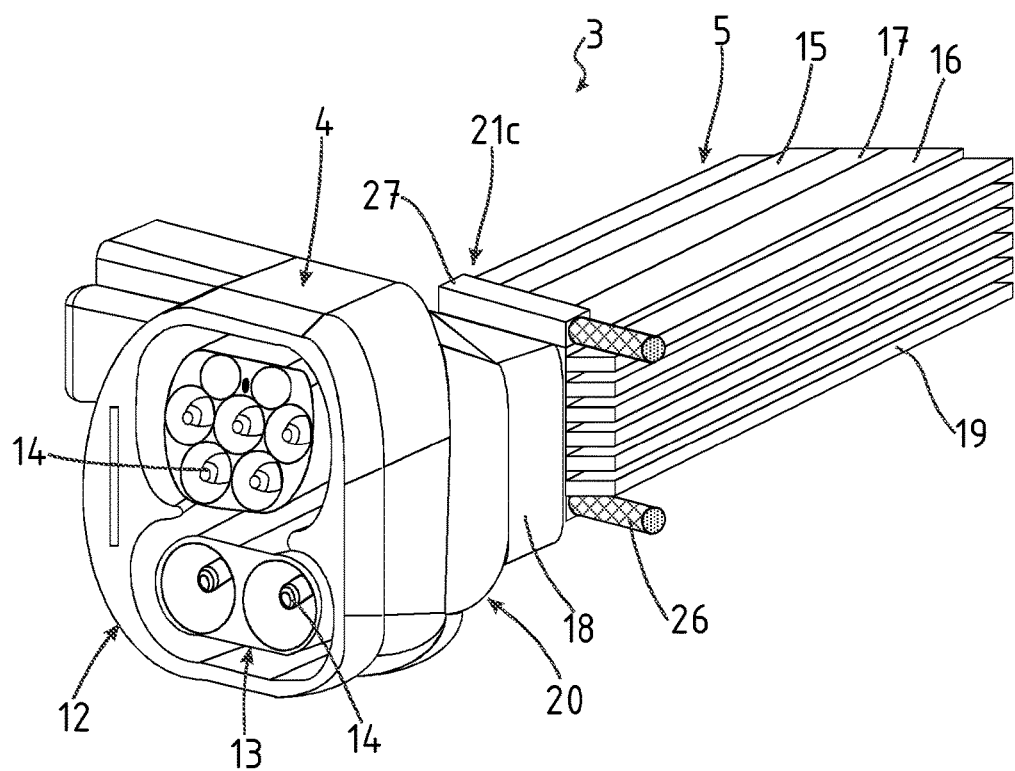
FIG. 4 shows an electrical charging arrangement in accordance with some embodiments.

In the cooling means 21c of the charging arrangement 3 as illustrated in FIG. 4, pipe bodies 26 in the form of coolant conductors or heat transfer channels are electrically insulated from the current conductor 5. Coolant collectors 27 are arranged at heat transfer areas of the current conductor 5, it being possible for heat both from the power coupling means 4 and also from the current conductor 5 to be transported away by means of the coolant collector. The pipe bodies 26 communicate with the coolant collectors 27 for this purpose.

Figure 5:
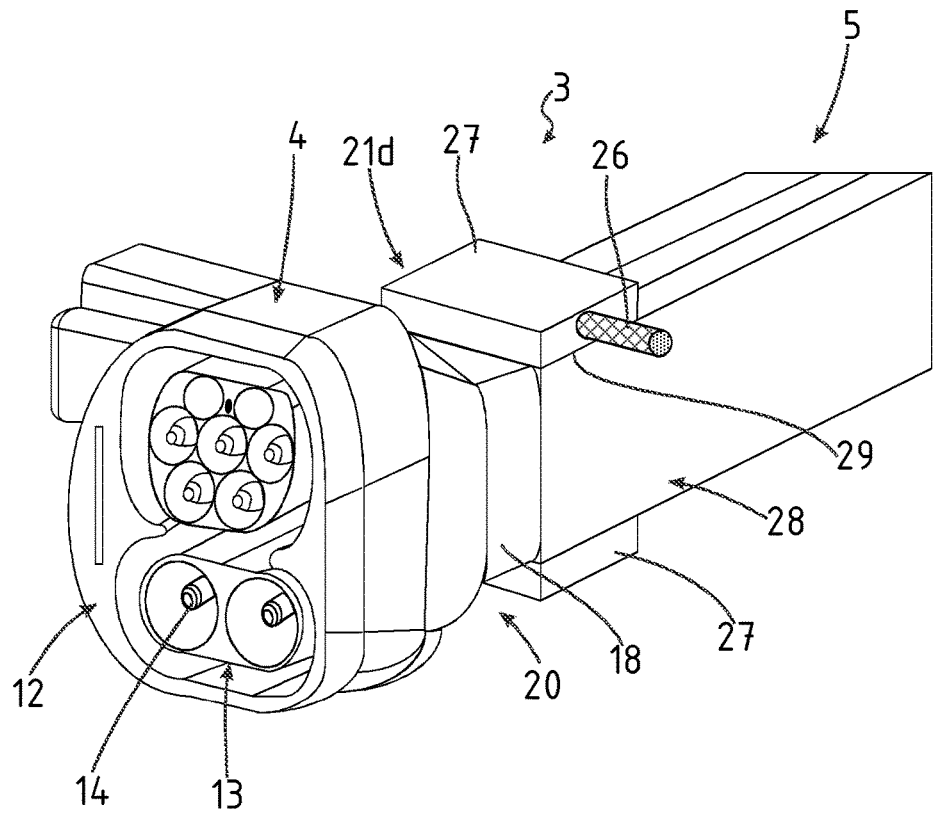
FIG. 5 shows a further fourth modification to an electrical charging arrangement; and, FIG. 6 shows an electrical charging arrangement in accordance with some embodiments.
Figure 6:
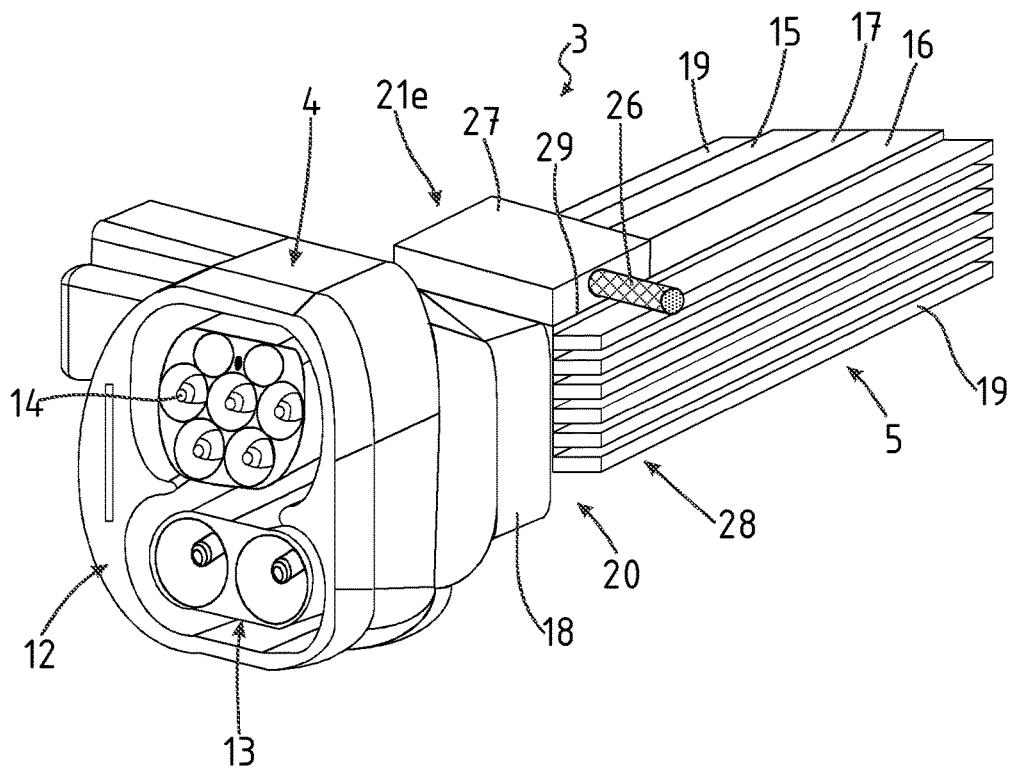

A cooling means 21d and, respectively, 21e which implements indirect convection and diffusion cooling of the power coupling means 4 is provided in each of the charging arrangements 3 as illustrated in FIGS. 5 and 6. To this end, heat is drawn or removed from the charging arrangement 3 by means of the current conductor 5. Coolant collectors 27 are arranged at that end 28 of the current conductor 5 which is connected to the power coupling means 4 on the outer faces 29 of the current conductor 5 on the top side and on the bottom side. Heat is drawn by means of the heat transfer areas, which are in contact with one another, of the coolant collector 27 and of the current conductor 5. The thermal energy drawn is discharged by means of a pipe body 26 (coolant conductor or heat carrier channel) which is electrically insulated from the current conductor 5 and is either supplied for further use or is discharged to the environment.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. An electrical charging arrangement for a motor vehicle, comprising:
 a charging socket or charging jack having a rear side;
 at least one current conductor; and
 at least one cooling element disposed on the rear side of the charging socket or charging jack, and facing the current conductor; and
 wherein the charging socket or charging jack is cooled from the rear side,
 wherein the cooling element is a fluid cooling apparatus having at least one pipe body for heat dissipation, and
 wherein the at least one pipe body comprises a coolant conductor or a heat carrier channel, and is electrically insulated from the at least one current conductor.

2. The electrical charging arrangement of claim 1, wherein the cooling element comprises at least one heat exchanger element.

3. The electrical charging arrangement of claim 1, wherein the current conductor comprises at least one extruded conductor profile comprising a light alloy.

4. The electrical charging arrangement of claim 3, wherein the conductor profile comprises at least one inner channel having a circumference, wherein the at least one inner channel is closed at the circumference, for conducting a heat carrier medium, for guiding line, or the at least one pipe body.

5. The electrical charging arrangement of claim 4, wherein the conductor profile comprises at least one heat transfer element on its outer face.

6. The electrical charging arrangement of claim 4, wherein the conductor profile comprises at least one profile element with increasing stiffness.

7. The electrical charging arrangement of claim 6, wherein the least one profile element is a rib.

8. The electrical charging arrangement of claim 3, wherein
- the at least one extruded conductor profile comprises at least two conductor profiles arranged parallel to one another,
- the electrical charging arrangement further comprises an insulator, and
- the at least two conductor profiles are insulated from one another and attached to one another by the insulator.

9. A motor vehicle comprising the electrical charging arrangement of claim 1.

10. The electrical charging arrangement of claim 1, wherein the cooling element further comprises a coolant collector.

* * * * *